(12) United States Patent
Mesh et al.

(10) Patent No.: US 8,392,487 B1
(45) Date of Patent: Mar. 5, 2013

(54) PROGRAMMABLE MATRIX PROCESSOR

(75) Inventors: Michael Mesh, Kfar Saba (IL); Michael Laor, Zichron Yaakov (IL); Alexander Zeltser, Netanya (IL)

(73) Assignee: Compass Electro-Optical Systems Ltd, Natanya (IL)

( * ) Notice: Subject to any disclaimer, the term of this patent is extended or adjusted under 35 U.S.C. 154(b) by 1318 days.

(21) Appl. No.: 12/058,783

(22) Filed: Mar. 31, 2008

Related U.S. Application Data

(60) Provisional application No. 60/908,703, filed on Mar. 29, 2007.

(51) Int. Cl.
*G06E 1/04* (2006.01)
*G06F 1/32* (2006.01)

(52) U.S. Cl. .................................. 708/191; 708/520

(58) Field of Classification Search .................. 708/191, 708/520, 607, 800–854
See application file for complete search history.

(56) References Cited

U.S. PATENT DOCUMENTS

| | | | |
|---|---|---|---|
| 6,178,020 B1* | 1/2001 | Schultz et al. ................. 359/107 |
| 7,012,749 B1* | 3/2006 | Mendlovic et al. ............ 359/560 |
| 2004/0243657 A1* | 12/2004 | Goren et al. .................. 708/607 |

* cited by examiner

*Primary Examiner* — Tan V. Mai
(74) *Attorney, Agent, or Firm* — Wilmer Cutler Pickering Hale and Dorr LLP

(57) ABSTRACT

A matrix processor and processing method, the processor including a data encoder for receiving an input data stream; a data controller coupled to the data encoder for arranging the input data in an operand matrix, at least one processing unit for processing the data in matrix form by Boolean matrix-matrix multiplication with a selected operator matrix, and an output control module coupled to the processing unit for outputting desired results therefrom.

16 Claims, 5 Drawing Sheets

PROGRAMMABLE MATRIX PROCESSOR

CROSS REFERENCE TO RELATED APPLICATION

This application claims priority under 35 U.S.C. §119(e) to U.S. Provisional Application No. 60/908,703, filed Mar. 29, 2007.

FIELD OF THE INVENTION

The present invention relates to a programmable matrix processor, preferably an optical processor, and a method for processing therewith.

BACKGROUND OF THE INVENTION

Different architectures of processor devices are well known in the art. Matrix processors have advantages related to high parallelism, structure uniformity and possible scalability. Typically, conventional matrix processors consist of a plurality of electronic components, only, each designed to perform a different kind of operation (i.e., adder, multiplier, etc.) These components may be programmable arithmetical and logical units which utilize shared, usually concurrently accessible code and data memory resources with a small number of per unit fast registers and cache memories. Each such component can perform only one or a limited number of logical operations, which limits the applications which each such processor can implement. In the case of programmable devices, using software brings more flexibility, however such devices are limited by speed (rate of processing). In addition, the use of shared resources may lead to starvation of processing units and decrease the rate of processing.

In order to increase the rate of processing, processors using optical components have been proposed. However, such devices are typically limited to one multiplication per time clock. While the rate of operation and parallelism could be high by using optics, operation of these devices is very specific. One such processor performs fast multiplication of a fixed size input vector on a slowly changing fixed size matrix, thus obtaining a fixed size resulting vector. The majority of existing embodiments of "optical" processors have the same (or similar) drawbacks: non-flexible processing data structure and very limited (unvarying or slowly varying) reprogramming capabilities.

Due to the structure of conventional optical processors with vector matrix multiplication architecture (one fixed length vector is multiplied on one fixed size matrix (which can be slowly updated)), these devices cannot perform the full range of logical operations or rotational shift of long strings with different lengths, permutation of bits in a string, correlation between different strings, etc.

Accordingly, there is a long felt need for a relatively simple device for performing matrix processing at high speeds and low power consumption that permits performance of correlation and logical functions on strings of data.

BRIEF DESCRIPTION OF THE DRAWINGS

The present invention will be further understood and appreciated from the following detailed description taken in conjunction with the drawings in which.

SUMMARY OF THE INVENTION

Figure 1:
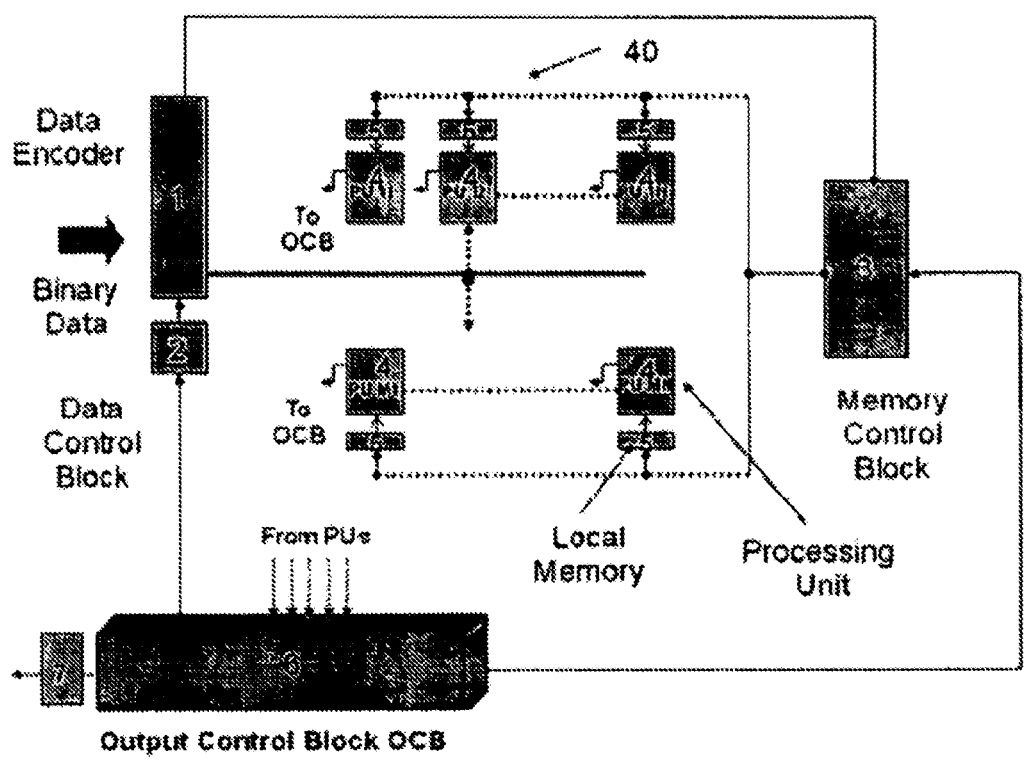
FIG. 1 is a block diagram illustration of one embodiment of a generic matrix processor, which is used to describe the invention.

The present invention relates to a matrix processor that is based on Boolean matrix transforms. More specifically, the invention relates to multi-purpose processing devices, specifically processing devices for performing matrix transformation which enable logical, arithmetical and look up operations. Essentially, all operations are based on vector matrix multiplication, using different encoding of a vector of any size and/or a different matrix in order to perform the different operations.

According to the invention, there is provided a matrix processor and processing method, the processor including a data encoder for receiving an input data stream; a data controller coupled to the data encoder for arranging the input data in an operand matrix, at least one processing unit for processing the data in matrix form by Boolean matrix-matrix multiplication with a selected operator matrix, and an output control module coupled to the processing unit for outputting desired results therefrom.

According to one embodiment, the matrix processor includes a data encoder for generating an operand matrix from an input data stream, at least one local memory, a processing unit, associated with each local memory, for generating an operator matrix from values stored in that local memory, a controller for controlling logical operation of the processing unit, and means for performing Boolean logical operations between the operand matrix and the operator matrix determined by the controller, so as to produce an output result.

According to another embodiment of the invention, the matrix processor includes a single input matrix device, a data control block in which an input matrix is replicated, and multiple processing units by which the replicated matrices are processed and multiple multiplication patterns are output.

According to one embodiment, each processing unit includes two inputs, one for data and one for control, means which performs element-wise logical AND, means which performs column-wise OR, an optional programmable logical element which performs OR/NOR; and an output for results of the processing.

There is also provided, in accordance with the invention, a method for matrix processing including generating an operand matrix from an input data stream, generating an operator matrix from values stored in at least one local memory, and performing selected Boolean logical operations between the operand matrix and the operator matrix, so as to perform a selected processing operation on said input data stream.

There is further provided a method for matrix processing including encoding an incoming bit stream according to a desired operation to be performed, forming an input bit matrix from the encoded bit stream, replicating the input bit matrix, performing bit-wise logical AND between a replicated input bit matrix and a preloaded operator bit matrix of bigger size, and performing group-wise logical OR operations between the results of the logical AND.

According to one embodiment of the invention, the method further comprises performing an OR/NOR operation on results of the logical OR operations by means of a programmable OR/NOR module.

DETAILED DESCRIPTION OF THE INVENTION

The present invention relates to a matrix processor for performing logical, arithmetical and look up operations that are based on Boolean matrix transforms. According to one preferred embodiment, the matrix processor utilizes optical and electronic units to increase speed of processing and reduce power consumption and heat emission.

The matrix processor of the present invention organizes or arranges data in a matrix on which complete Boolean algebra operations can be performed, for performing logical, arithmetical and look up (correlation) operations. For data represented in matrix form, using an element-wise AND operation and a column-wise OR operation, together with an optional additional OR/NOR operation, a complete Boolean algebra can be built. It is merely necessary for the data to be properly represented and encoded. The matrix processor includes components which first perform bit-wise multiplication of a vector V by a matrix M (for example, an incoming bit stream and a processing matrix), that is, for each row i of M, multiply bit V(i) by each bit in row M(i). Now the processor performs bit-wise logical OR across each column of the above product, to produce a resultant vector R. Any distinct bit of R is equal to 0 if, and only if, every bit in corresponding column vector of M is not equal to the corresponding bit in V, or when they both are equal to 0. One of the following operations can be performed on R—find first/multiple 0 (1), use the resulting vector R as a new V or M, or use the results as a reference for a next operation. V and M can be loaded to a new value each cycle, (e.g., 1ns), based on control information and/or a previous result. It is a particular feature of the invention that a single physical unit performs a variety of operations, the type of operation being based on the values loaded into the matrix and the method of encoding the vector. In other words, the physical operation is fixed and identical, and the type of operation is a function of the matrix values. According to one preferred embodiment, generation of the result vector R is performed photonically.

Referring to FIG. 1, there is shown a block diagram of a generic matrix processor 40 according to one embodiment of the invention. This matrix processor, based on Boolean matrix transforming, operates by interaction between two matrices. Matrix processor 40 includes a data encoder 1, a data control block 2, a memory control block 3, processing units 4, local memories 5 and an output control block 6.

Data encoder 1 interfaces between a data source 8 (for example, a communication network) and the processor 40 for receiving an input bit stream of binary data. Thus, the architecture of this embodiment includes a single input matrix device. In the present invention, bit stream 8 is received from the network or media through a physical interface. This interface may take any form, depending on the physical medium of the network.

Data control block 2 manages the data encoder 1. This includes defining a segment of the incoming bit stream to operate on, determining an encoding scheme utilizing specific codes, if any; filling the matrix with specific patterns of bits; organizing, replicating or adding bits under specific rules, etc. Thus, data control block 2 controls the way in which an input matrix (vector) is replicated. The bit patterns are output by data encoder 1, and are replicated by sending the bit patterns to multiple processing units 4, where the replicated matrices are processed and multiple resulting patterns are output. Processing units 4 are organized and connected in the form of an N×M matrix. Each processing unit 4 is connected to a local memory 5. All local memories 5 are connected to memory control block 3, which controls the addresses which are read from local memories 5 and loaded to processing units 4.

Each processing unit 4 is independent and operates on two matrices: one matrix received from data encoder 1 (and built from a data stream 8 received from the network or the media), and one matrix received from a local memory 5. The matrix produced by data encoder 1 is defined as an Operand or Operands. The matrix which is formed by all N×M processing units 4, with the values uploaded from the local memory 5, is defined as an Operator.

Preferably, for the processing performed by processing units 4:

1. All matrix elements are 1-bit (two level).
2. All logical elements are two-level devices, strongly resolving 0 and 1 values of a signal.
3. Replicated data is represented in the form of a matrix, rather than in vector form.
4. Data can be encoded depending on the specific functionality required—logical, arithmetical or look up searching operation
5. In comparison to linear algebraic operations of vector-matrix multiplication, embodiments of the present invention use Boolean logical equivalents of vector-matrix operations. Element-wise multiplication is substituted by logical AND, while summation corresponds to logical OR Output bit streams, transmitted from processing units 4, are processed in output control block 6, and are transmitted to the network or the media via an output interface 7. In parallel, they can be used again by the data control block 2 for additional processing or by the memory control block 3 for loading new values onto processing units 4. It will be appreciated by those skilled in the art that the main controller for controlling logical operation of the processing unit is the memory control block 3, while the processing units receive control signals together with data from the data encoder.

Figure 2:
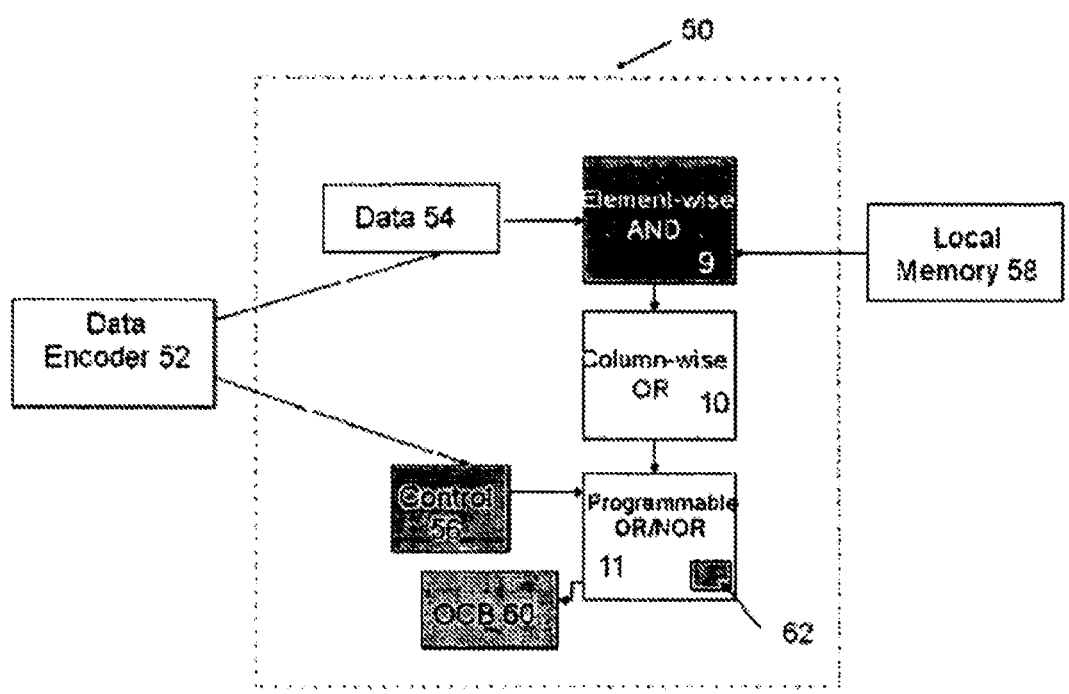
FIG. 2 is a block diagram of one embodiment of a processing unit for use in the matrix processor of FIG. 1.

A block diagram of one embodiment of a processing unit 50 is depicted in FIG. 2. Processing unit 50 has two external inputs from data encoder 52, one for data 54 and one for control 56, and one internal interface to local memory 58. Processing unit 50 further includes a module 9 which performs (n×m) element-wise logical AND between data received from data encoder 52 and data obtained from local memory 58, a module 10 which performs column-wise OR on the results of the processing in module 9, an optional programmable logical element 11 which performs OR/NOR, and one output to an output control block 60 for results of the processing. The function of the OR/NOR block is post-processing of results obtained from module 10 according to the operand's structure and desired operation. Such OR/NOR operation is required in the following cases:

the length of the operands is more than the pattern's column height m, or/and the desired operator contains a bitwise XOR programmable operation (particulary, while not limited, used for look up and correlation operations),
in cases when the resulting vector-pattern must be shorter than n-bits.

According to one embodiment of the invention, module 9 consists of an n×m matrix of AND logical gates, while module 10 contains n(m×1) logical OR elements. Control circuits 62 are also provided inside logical element 11 to perform configuration of specific OR or NOR functions. Thus, logical element 11 receives n-bit (vector) data from module 10. According to the control signals received from data encoder 52 and output control block 60, logical element 11 can be configured (pre-programmed) to perform additional OR/NOR operations within sub-sets (2 . . . n bits according to the controller) of its input vector, so as to produce k-bit (k=1, 2, . . . n) output. Thus, "configuration" here means:
 a) choosing OR or NOR
 b) choosing the size of the sub-sets
 c) optionally choosing the number of cascades of the above processing, as well as to process certain additional operations.

According to one of the embodiments, control of the matrix processor is as follows. Data control block 2 (DCB 2):
 1) extracts control information about the structure of operands from the input bit stream 8 or/and receives the above information from memory control block 3 through outgoing control block (OCB) 6.
 2) selects an encoding scheme according 1).
 3) fashions control bits for control circuits 62 of programmable OR/NOR block 11, according to 2).
 4) These control bits then
  a) are appropriately encoded by data encoder 1, which then
  b) attaches a control pattern fashioned in this manner to the data pattern.
  c) In addition, these control bits can be sent to the memory control block 3.
Processing unit (PU 4) then
 1) separates the data and control patterns and sends
  a) the data to element wise AND block (9) and
  b) the control to control circuits 62 of OR/NOR block 11, correspondingly.

Operation of matrix processor 40 will now be described with further reference to FIG. 1. In a manner well-known in the art, bit stream 8 is received from the physical medium at an input interface of data encoder 1. Data encoder 1 is operated by data control block 2 to determine the handling of incoming bits of data stream 8. Incoming bit stream 8 may include handling information that is used by data control block 2 (to determine bit stream structuring), by output control block 6 (to determine output bit stream destination) and by memory control block 3 (to determine uploading information for each local memory).

As stated above, bit streams 8 are operated on by data control block 2. The operations performed by data control block 2 include one or more of the following:
 definition of a specific segment of incoming bit stream 8 and use of a specific size of the segment;
 encoding bits according to specific codes;
 filling a matrix with specific patterns of bits;
 organizing bits into a matrix of rows and columns of specific size and in a specific sequence;
 replicating or adding bits under specific rules.

The output bit stream destination determined by output control block 6 can include the output interface 7 to a network or medium, or the data control block 2, for an additional cycle of processing.

Uploading of information is determined by memory control block 3 for each local memory 5, individually. Operations performed by memory control block 3 include one or more of the following:
 specifying a segment of bits stored in the local memory to be loaded into the associated processor 4;
 uploading specific bits;
 uploading specific patterns of bits.

It will be appreciated that the specific segment and pattern required for each of the various operations capable of being performed by the matrix processor are pre-programmed into memory control block 3 to permit selection of the desired operation.

In one embodiment of the present invention, the network reaches telecom or datacom equipment, whose signal is transmitted over an optical fiber. Hence, the network physical interface must provide optical to electrical conversion, clock recovery, serial to parallel conversion, framing, payload extraction, packet delineation, and packet multiplexing, as by means well known in the art.

Although possible examples describe an optical fiber medium and (in particular) the Ethernet medium and encapsulation standard and the IP and TCP transport protocols, those skilled in the art will realize that framing/encapsulation schemes and media other than Ethernet, including those with higher or lower speeds such as OC12, OC192, SDH, packet over SONET, and ATM framing/encapsulation schemes and copper (wire) or fiber optic media, can be used.

Likewise, protocols other than TCP/IP can be used, such as UDP, ATM or MPLS.

Likewise, an image or video transmission protocol can be used, such JPEG or MPEG.

Likewise, a storage transmission protocol can be used, as ESCON, fibre channel, etc.

Also Internet Protocol version 4 (IPv4) and newer IP version 6 (IPv6) can be used, as well as Multi-Protocol Label Switching (MPLS) and other protocols known in the art.

Accordingly, the present invention is not limited to any particular type of media or protocol. Rather, the present invention of matrix processor architecture is concerned with the processing of the received bits after they are extracted from the medium.

The bit stream initially enters data encoder 1. Data encoder 1 is employed to organize bits in the operand matrix of n columns with m bits in each column. The operand matrix is transmitted in parallel to N×M processing units 4 and replicated N×M times this way. Because N and M can be of different values (N, M≧1), different replication factors can be applied for both rows and columns. This means that the matrix is rectangular, where each pair of parallel sides can have a different size.

Each processing unit 4 is also a matrix of n×m elements, loaded by specific values from the local memories 5. N×M numbers of n×m elements each, produced by the processing units 4, are included in one big matrix with Nn×Mm elements. In this way, the Operator can be built as a matrix of elements with different or same values, depending on the exact operation which is desired. This method of matrix building provides very high flexibility for the matrix processor.

In the next stage, the processing units 4 produce a number of logical OR operations across each of n rows, to set a matrix of N×M of the vectors of n-bits length each.

As was mentioned above, the physical size of the Operator matrix is fixed (which means a fixed number of matrix elements in the Operand and replication factors). The size is preset according to the specific operation the processor intends to perform.

However, information can be loaded in different ways—single bits, repeated bits and groups, bit patterns; all of that loaded by columns or rows, replicated fully or partially, etc. This combination of pre-set matrix configuration and dynamic data loading provides unprecedented flexibility of the matrix processor according to embodiments of the present invention and enable logical, arithmetical or look up operations.

To obtain the results R defined below, each processing unit 4 performs n×m bit wise logical AND operations between data that comes from data encoder 1 and the local memory 5.

Formally, the sequence of operation can be depicted as:

$$R_b^{c,d} = \bigcup_{i=1}^{m} (C_{i,b}^{c,d} \& V^{i,b}); \quad \bigcup\text{-bitwise logical "OR"} \quad \begin{cases} i = 1 \div m \\ b = 1 \div n \\ c = 1 \div M \\ d = 1 \div N \end{cases}$$

$$v = \begin{bmatrix} \circ & \circ & \cdots & \bullet & \bullet \\ \vdots & \vdots & \ddots & \vdots & \vdots \\ \bullet & \circ & \cdots & \circ & \bullet \end{bmatrix} \updownarrow m \qquad C^{c,d} = \begin{bmatrix} \bullet & \circ & \cdots & \bullet & \circ \\ \vdots & \vdots & \ddots & \vdots & \vdots \\ \circ & \bullet & \cdots & \circ & \bullet \end{bmatrix} \updownarrow m$$

$$C = \begin{bmatrix} m\{\overline{C^{1,1}}^n & m\{\overline{C^{1,2}}^n & \cdots & m\{\overline{C^{1,N-1}}^n & m\{\overline{C^{1,N}}^n \\ m\{\overline{C^{2,1}}^n & m\{\overline{C^{2,2}}^n & \cdots & m\{\overline{C^{2,N-1}}^n & m\{\overline{C^{2,N}}^n \\ \vdots & \vdots & \ddots & \vdots & \vdots \\ m\{\overline{C^{M-1,1}}^n & m\{\overline{C^{M-1,2}}^n & \cdots & m\{\overline{C^{M-1,N-1}}^n & m\{\overline{C^{M-1,N}}^n \\ m\{\overline{C^{M,1}}^n & m\{\overline{C^{M,2}}^n & \cdots & m\{\overline{C^{M,N-1}}^n & m\{\overline{C^{M,N}}^n \end{bmatrix} \updownarrow M$$

$$R = \begin{bmatrix} 1\{\overline{R^{1,1}}^n & 1\{\overline{R^{1,2}}^n & \cdots & 1\{\overline{R^{1,N-1}}^n & 1\{\overline{R^{1,N}}^n \\ 1\{\overline{R^{2,1}}^n & 1\{\overline{R^{2,2}}^n & \cdots & 1\{\overline{R^{2,N-1}}^n & 1\{\overline{R^{2,N}}^n \\ \vdots & \vdots & \ddots & \vdots & \vdots \\ 1\{\overline{R^{M-1,1}}^n & 1\{\overline{R^{M-1,2}}^n & \cdots & 1\{\overline{R^{M-1,N-1}}^n & 1\{\overline{R^{M-1,N}}^n \\ 1\{\overline{R^{M,1}}^n & 1\{\overline{R^{M,2}}^n & \cdots & 1\{\overline{R^{M,N-1}}^n & 1\{\overline{R^{M,N}}^n \end{bmatrix} \updownarrow M$$

$$R^{c,d} = [\bullet \quad \circ \quad \cdots \quad \bullet \quad \circ]$$

where V is the data matrix on the output of data encoder 1 and $C^{c,d}$ are the multiple data matrices uploaded on each processing unit 4 from local memories 5.

Accordingly, $R^{c,d}$ is the result obtained after bit wise logical AND and following column wise OR operations on each processing unit 4.

Optionally (not shown in the expressions above), additional logical operations can be applied to each n-bits vector $R^{c,d}$, if required (see element 11 functionality). (Note that it should be the same operation for all vectors).

The proposed matrix processor has strong advantages: to be programmable and to operate dynamically with a set of different vector/matrix sizes without loss of efficiency and without increasing the number of long interconnects for longer vector lengths.

Figure 3:
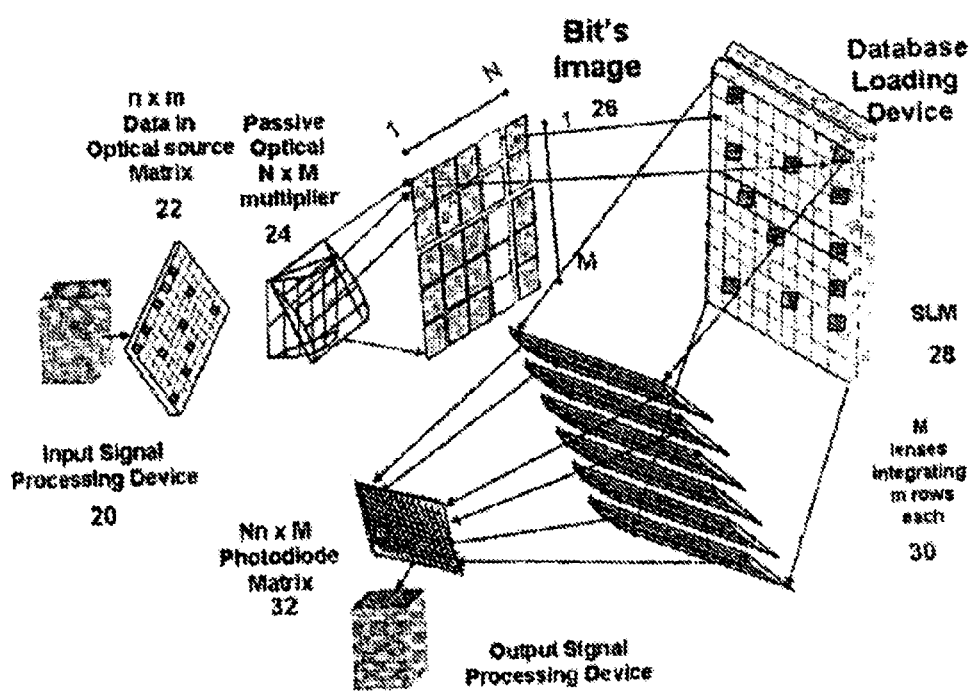
FIG. 3 is a schematic illustration of the geometry of an optical setup for a matrix processor according to an alternative embodiment of the invention.

According to one embodiment of the invention, the matrix processor is assembled from electronic components only. Alternatively, in an exemplary embodiment illustrated schematically in FIG. 3, the Boolean matrix parallel processor can be realized optically, by using electro-optical components. This processor includes 3 main known in the art optoelectronic transformation devices:

Optical Source

SLM

Photo Detector

In the matrix processor architecture described below and proposed in the current invention:

1. All optoelectronic elements are 1-bit (two level) devices.

2. The photo detector or receiver is a hard-threshold device, strongly resolving 0 and 1 values of a signal.

2. Replicated data is represented in the form of a matrix or matrices.

3. Data is encoded to simplify the optical signal logical discrimination.

4. Operation of analog matrix multiplication is replaced by its logical equivalent, where element-wise multiplication is substituted by logical AND, then summation turns into logical OR, correspondingly.

A digital input signal comes to the optical source 22 from an input signal processing device 20 (a data encoder and data control block). The optical source 22 is the n×m matrix (for example, a VCSELs matrix), switched on for "1" and off for 0, to produce an "image" of bright and dark pixels. This is the Operand.

A passive optical element 24 horizontally replicates this matrix image in a row of N images. Passive optical element 24 then vertically replicates the matrix columns M times to obtain an N×M matrix 26 of n×m images. Note that the same optical element may be used to replicate the image horizontally and vertically. For example, it can be a micro-lens array or another set of lenses. This replication operation is equivalent to sending data to multiple processing units 4, described above with reference to FIG. 1.

The replicated image illuminates a Spatial Light Modulator (SLM) 28 (with a size of Nn×Mm elements). One example of a suitable SLM is an InGaAs MQW matrix. One exemplary matrix includes 128 Kb pixels, divided into 256 columns of 512 bits. Loading from media can be accomplished in 1 ns. Each pixel of SLM 28 is set to value "1" or "0", which means reflects or does not reflect illumination light. This value is set by local memory 5 and memory control block 3 (depicted in FIG. 1), for example, eDRAM. In one example, each column is loaded every 2 ns, resulting in a 256 Gb/s loading rate.

The image reflected from each pixel of the SLM is actually a result of a bit-wise AND logical operation between the replicated incoming data and the data from the local memory. The image reflected from SLM 28 is passed through M optical lenses 30 (actually, optical collecting elements, like adders or other alternative solutions). Each of these lenses 30 or adders integrates light of m pixels height. This means, each adder integrates the signals from coupled n rows of images. The resulting image is focused on a photodiode matrix 32 for further electronic processing. The required matrix can be built from photodiodes that are known in the art.

Optoelectronic implementation of the proposed device and method has three main additional advantages:
1. Minimizes crosstalk.
2. Provides the opportunity to operate dynamically with a set of different vector and matrix sizes without loss of efficiency and without increasing crosstalk for longer vector lengths, in the case of vector matrix multiplication.
3. Optical image replication and subsequent light integration are provided by means of passive optics. Thus, there is no need for additional energy to produce these operations. Such optical operation is performed at the speed of light, in a multi-channel, parallel and very efficient manner.

Despite relatively simple binary signal representation and use of only 2-level intensity modulation, such a device functionally can be used for a wide range of unary, binary, ternary, . . . bit-vector and bit-matrix operations:
  Any sort of bit permutation within a bit vector or bit matrix.
  In particular, bitwise vector or matrix shift and rotation.
  Using double rail encoding, one can add any number of bit inversions to a permuted vector or matrix.
  Radix transform from double rail radix-2 numbers to radix-$2^k$ "one from $2^k$" encoded presentation (including multi-radix-$2^k$), and vice versa.
  Any kind of binary (vector-vector, matrix-matrix or vector-matrix) bitwise operations.
  Look up table and regular expression search.

All these manipulations can be performed by a minimum number of programmable/nonprogrammable electronic logic elements, i.e., local (per pixel at SLM site) or "almost" local (commutating only nearest neighbors at source and detector site (that is, the smallest number of elements, e.g., gates, in the desired location on the matrix)). Locality of electronic elements provides the possibility to increase the bit rate of the system without affecting optical bus capacity, thus providing a high degree of scalability.

For logical, arithmetical or look-up searching operations, different input signal encoding can be used. This means, the Operator will be optimized for use with a specific Operand or plurality of Operands.

Input Signal Encoding

A sample table of one exemplary form of signal encoding is presented in Table 1. "Key" means a signal encoded on the SLM. Data means a signal encoded on the optical source.

TABLE 1

| Bit value | Key | Data |
| --- | --- | --- |
| '0' | 01 | 10 |
| '1' | 10 | 01 |
| X | 00 | 00 |
| Ignore | 11 | 11 |

A sample of encoded signals utilizing Table 1 is presented in Table 2.

TABLE 2

| Data |
| --- |
| 0100 10011010 |
| 100x 01101000 |
| 1010 01100110 |
| 1100 01011010 |
| 111x 01010100 |
| 1xxx 01000000 |

Example of a Logical Operation (Bit-Wise Vector Inversion) Using the Matrix Processor of the Invention and an Encoding Scheme Suppose that the initial vector is 1110. The encoded vector is 10101001. The inverted vector should be received as 01010110.

Figure 4A:
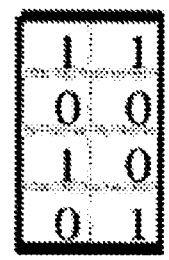
FIG. 4A is a transformed vector mapped on an optical source matrix according to aspects of the present disclosure.

This vector can be presented as:

$$\begin{bmatrix} 1 \\ 0 \\ 1 \\ 0 \\ 1 \\ 0 \\ 0 \\ 1 \end{bmatrix}$$

and the transformed vector, mapped on the optical source matrix 22 (FIG. 3) is shown in FIG. 4A.

Figure 4B:
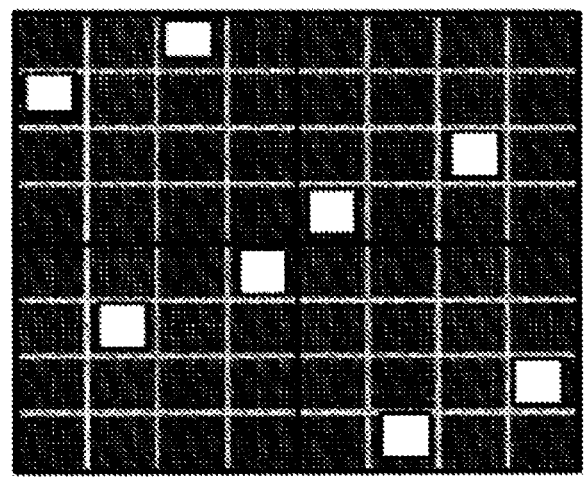
FIG. 4B is an input operand matrix replicated by passive optics according to aspects of the present disclosure.
Figure 4C:
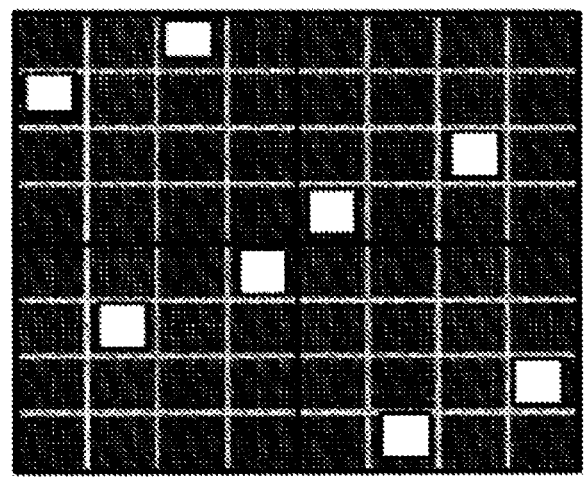
FIG. 4C is a pixel surface of a spatial light modulator according to aspects of the present disclosure.

After replication by passive optics, the input matrix operand 26 will be represented by the matrix of FIG. 4B. In order to provide bit-wise vector inversion, the SLM is programmed in the form shown in FIG. 4C (where a white point means that light will be reflected from the pixel surface of the SLM). In this case, light reflected from the SLM will have a form displayed in FIG. 5A. After optical integration of lights from each group of 4 rows, the photodiode matrix signal will be the matrix shown in FIG. 5B.

Figures 5A, 5B, 5C:
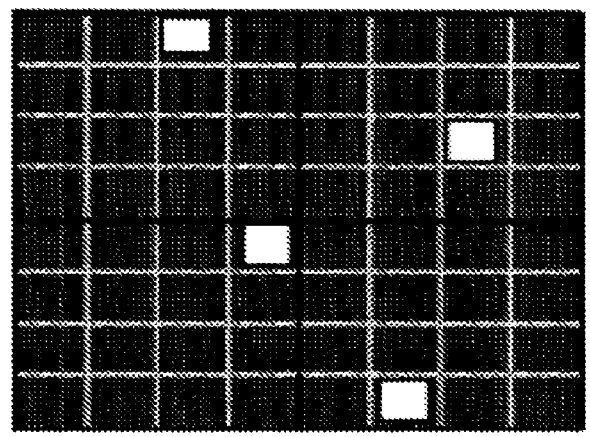
FIG. 5A is light reflected from a spatial light modulator according to aspects of the present disclosure.
FIG. 5B is a photodiode matrix signal after optical integration of lights according to aspects of the present disclosure.
FIG. 5C is an inverted vector after the last stage of electronic integration according to aspects of the present disclosure.

Finally, after the last stage of electronic integration (additional OR through module 11), the signal will be presented in the matrix form shown in FIG. 5C. The required result of vector inversion is obtained and the resulting vector is 01010110.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A matrix processor comprising:
   a data encoder for receiving an input data stream;
   a data controller coupled to said data encoder for arranging said input data in binary operand matrix and for replicating the binary operand matrix;
   at least one processing unit for processing said replicated binary operand matrix by Boolean matrix-matrix multiplication with a selected binary operator matrix, wherein the at least one processing unit includes:
      a first module configured to perform element-wise Boolean AND operations on corresponding elements of the binary operand matrix and of the binary operator matrix; and
      a second module configured to perform column-wise Boolean OR operations on results of said Boolean AND operations; and
   an output control module coupled to said at least one processing unit configured to output results of the Boolean matrix-matrix multiplication.

2. The matrix processor according to claim 1, wherein the at least one processing unit further includes a programmable logical element for performing Boolean OR/NOR operations on results of said column-wise Boolean OR operations and outputting results of the at least one processing unit.

3. The matrix processor according to claim 2, wherein said programmable logical element includes control circuits for performing configurations of said Boolean OR/NOR operations.

4. The matrix processor according to claim 1, wherein:
said data encoder is an input signal processing device; and
said at least one processing unit includes:
- a Spatial Light Modulator ("SLM") coupled to a memory;
- integrating elements coupled to said SLM; and
- an output signal processing device.

5. The matrix processor according to claim 4, wherein
said input signal processing device includes a passive optical multiplier;
said memory is coupled to a memory control unit for selecting appropriate values from said memory to upload onto said SLM;
said integrating elements include a lens array; and
said output signal processing device includes a photo diode matrix.

6. A matrix processor comprising:
a data encoder for generating a binary operand matrix from an input data stream;
at least one processing unit, associated with a corresponding local memory, for generating a binary operator matrix from values stored in said corresponding local memory and performing Boolean operations between said binary operand matrix and said binary operator matrix, wherein the at least one processing unit includes:
- a first module configured to perform element-wise Boolean AND operations on corresponding elements of the binary operand matrix and of the binary operator matrix; and
- a second module configured to perform column-wise Boolean OR operations on results of said Boolean AND operations;
a controller for controlling the Boolean operations of said at least one processing unit, so as to perform a selected matrix processing operation; and
an output control module coupled to said at least one processing unit configured to output results of the Boolean operations.

7. The matrix processor according to claim 6, wherein:
said data encoder is an input signal processing device; and
said at least one processing unit includes:
an SLM coupled to a memory;
integrating elements coupled to said SLM; and
an output signal processing device.

8. The matrix processor according to claim 7, wherein
said input signal processing device includes a passive optical multiplier;
said memory is coupled to a memory control unit for selecting appropriate values from said memory to upload onto said SLM;
said integrating elements include a lens array; and
said output signal processing device includes a photo diode matrix.

9. A method for matrix processing comprising:
forming by a matrix processor a binary operand matrix from an input data stream;
forming by the matrix processor a binary operator matrix from values stored in at least one local memory, wherein the at least one local memory is electrically coupled to the matrix processor; and
performing by the matrix processor selected Boolean operations between said binary operand matrix and said binary operator matrix, wherein the Boolean operations include:
element-wise Boolean AND operations between the operand matrix and the operator matrix; and
group-wise Boolean OR operations between the results of said Boolean AND operations.

10. A method for matrix processing comprising:
encoding by a matrix processor an incoming bit stream according to a desired operation to be performed;
forming by the matrix processor a binary operand matrix from said encoded bit stream;
replicating by the matrix processor said binary operand matrix;
performing by the matrix processor bit-wise Boolean AND operations between the replicated binary operand matrix and a preloaded binary operator matrix of bigger size; and
performing by the matrix processor group-wise Boolean OR operations between the results of said Boolean AND operations.

11. The method according to claim 10, further comprising performing Boolean OR/NOR operations on results of said Boolean OR operations.

12. The method according to claim 10, further comprising:
organizing bits of a bit stream in the binary operand matrix of n columns with m bits in each columns; and
transmitting said binary operand matrix in parallel to N×M processing units, thereby replicating said binary operand matrix N×M times.

13. The method according to claim 10, further comprising:
loading pre-selected elements of the binary operator matrix on an SLM in accordance with the desired operation to be performed; and
processing opto-electronically optically integrated output signals, wherein:
the step of forming includes forming an optical source matrix;
the step of replicating includes multiplying by a passive optical multiplier;
the step of performing bit-wise Boolean AND operations includes illuminating said SLM by an output of said passive optical multiplier; and
the step of performing group-wise Boolean OR operations includes optically integrating output signals from said illuminated SLM.

14. The method according to claim 13, wherein
said step of loading includes loading, from a memory, data selected by a memory control unit;
said step of integrating includes integrating via a lens array; and
said step of processing includes processing on a photo diode matrix.

15. The method according to claim 10, wherein the sequence of operation of the matrix processor can be depicted as $$R_b^{c,d} = \bigcup_{i=1}^{m} (C_{i,b}^{c,d} \& V^{i,b}); \quad \bigcup \text{-bitwise logical "OR"} \begin{cases} i = 1 \div m \\ b = 1 \div n \\ c = 1 \div M \\ d = 1 \div N \end{cases}$$

$$v = \begin{bmatrix} \circ & \circ & \cdots & \bullet & \bullet \\ \vdots & \vdots & \ddots & \vdots & \vdots \\ \bullet & \circ & \cdots & \circ & \bullet \end{bmatrix} \updownarrow m \quad C^{c,d} = \begin{bmatrix} \bullet & \circ & \cdots & \bullet & \circ \\ \vdots & \vdots & \ddots & \vdots & \vdots \\ \circ & \bullet & \cdots & \circ & \bullet \end{bmatrix} \updownarrow m$$
$$\leftarrow n \rightarrow \qquad\qquad\qquad \leftarrow n \rightarrow$$

$$C = \begin{bmatrix} \overbrace{m\{C^{1,1}}^{n} & \overbrace{m\{C^{1,2}}^{n} & \cdots & \overbrace{m\{C^{1,N-1}}^{n} & \overbrace{m\{C^{1,N}}^{n} \\ \overbrace{m\{C^{2,1}}^{n} & \overbrace{m\{C^{2,2}}^{n} & \cdots & \overbrace{m\{C^{2,N-1}}^{n} & \overbrace{m\{C^{2,N}}^{n} \\ \vdots & \vdots & \ddots & \vdots & \vdots \\ \overbrace{m\{C^{M-1,1}}^{n} & \overbrace{m\{C^{M-1,2}}^{n} & \cdots & \overbrace{m\{C^{M-1,N-1}}^{n} & \overbrace{m\{C^{M-1,N}}^{n} \\ \overbrace{m\{C^{M,1}}^{n} & \overbrace{m\{C^{M,2}}^{n} & \cdots & \overbrace{m\{C^{M,N-1}}^{n} & \overbrace{m\{C^{M,N}}^{n} \end{bmatrix} \updownarrow M$$
$$\leftarrow N \rightarrow$$

$$R = \begin{bmatrix} \overbrace{1\{R^{1,1}}^{n} & \overbrace{1\{R^{1,2}}^{n} & \cdots & \overbrace{1\{R^{1,N-1}}^{n} & \overbrace{1\{R^{1,N}}^{n} \\ \overbrace{1\{R^{2,1}}^{n} & \overbrace{1\{R^{2,2}}^{n} & \cdots & \overbrace{1\{R^{2,N-1}}^{n} & \overbrace{1\{R^{2,N}}^{n} \\ \vdots & \vdots & \ddots & \vdots & \vdots \\ \overbrace{1\{R^{M-1,1}}^{n} & \overbrace{1\{R^{M-1,2}}^{n} & \cdots & \overbrace{1\{R^{M-1,N-1}}^{n} & \overbrace{1\{R^{M-1,N}}^{n} \\ \overbrace{1\{R^{M,1}}^{n} & \overbrace{1\{R^{M,2}}^{n} & \cdots & \overbrace{1\{R^{M,N-1}}^{n} & \overbrace{1\{R^{M,N}}^{n} \end{bmatrix} \updownarrow M$$
$$\leftarrow N \rightarrow$$

$$R^{c,d} = [\bullet \quad \circ \quad \cdots \quad \bullet \quad \circ]$$
$$\leftarrow n \rightarrow$$

where v is the binary operand matrix and $C^{c,d}$ are multiple data matrices, wherein each data matrix is derived from the binary operator matrix.

16. The method according to claim 15, wherein each data matrix is uploaded on a corresponding processing unit from a corresponding local memory.

\* \* \* \* \*